July 11, 1933.   J. V. KINDL   1,917,981
GAS VALVE
Filed June 20, 1931   3 Sheets-Sheet 1

INVENTOR
JOSEPH V. KINDL
BY Fisher, Moser & Moore
ATTORNEY

July 11, 1933.  J. V. KINDL  1,917,981
GAS VALVE
Filed June 20, 1931   3 Sheets-Sheet 2
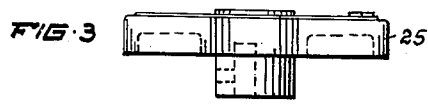
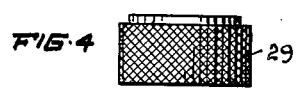
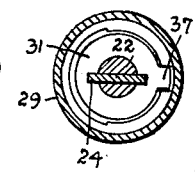
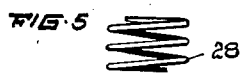
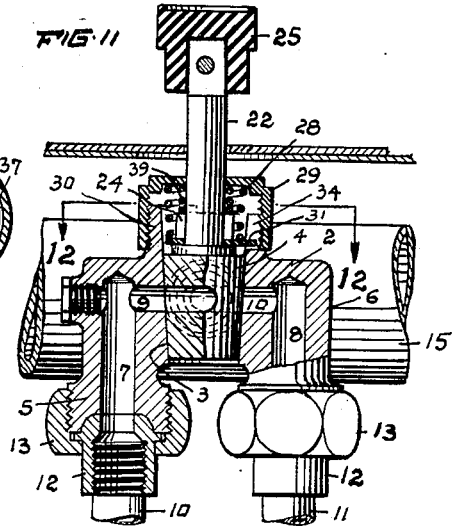
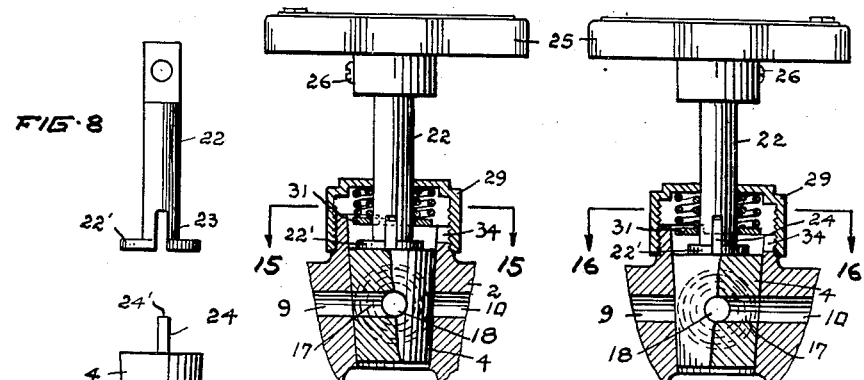
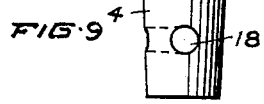
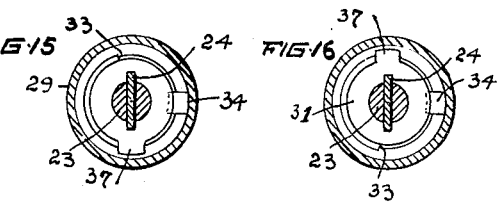
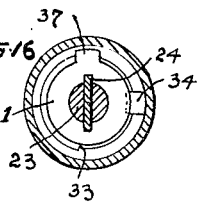
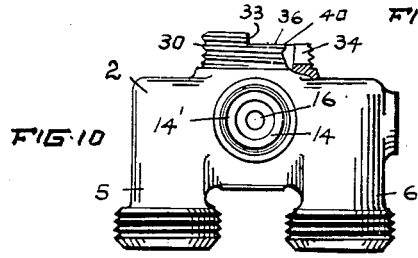
INVENTOR
JOSEPH V. KINDL
BY
Fisher, Moser & Moore
ATTORNEY July 11, 1933.    J. V. KINDL    1,917,981
GAS VALVE
Filed June 20, 1931    3 Sheets-Sheet 3
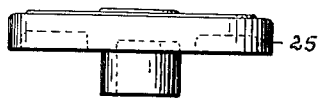
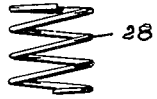
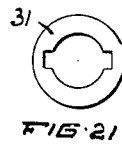
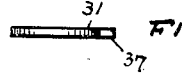
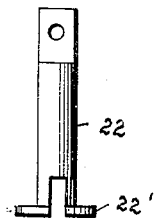
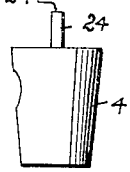
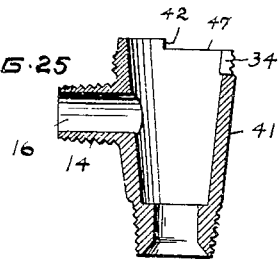
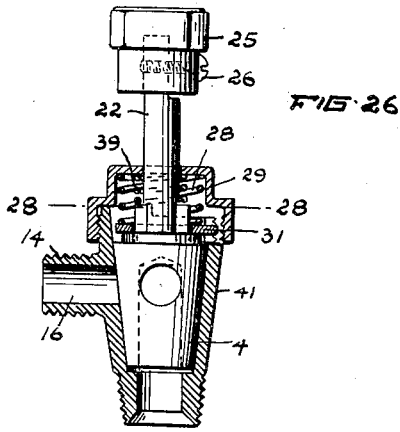
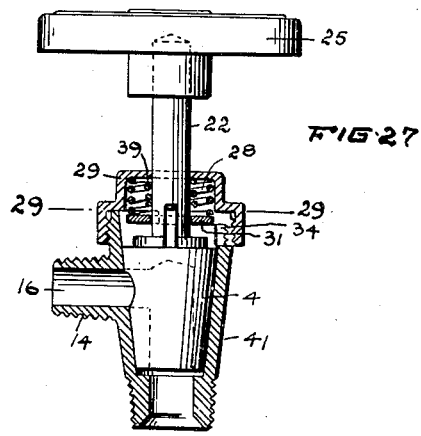
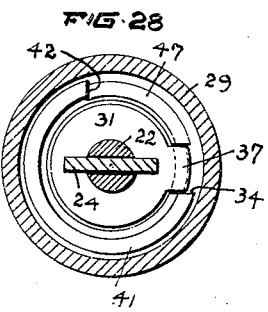
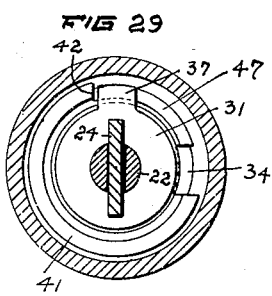
INVENTOR
JOSEPH V. KINDL
BY
Fisher, Moran + Moore
ATTORNEY Patented July 11, 1933

1,917,981

UNITED STATES PATENT OFFICE

JOSEPH V. KINDL, OF CLEVELAND, OHIO, ASSIGNOR TO THE W. J. SCHOENBERGER COMPANY, OF CLEVELAND, OHIO, A CORPORATION OF OHIO

GAS VALVE

Application filed June 20, 1931. Serial No. 545,698.

My invention relates in general to improvements in gas valves, and more particularly to automatically actuated locking means for locking such valves against accidental and careless operation. Such locking mechanism is especially necessary for two-way valves such as used in gas ranges with oven and broiler compartments, which include burners for each compartment and a single two-way controlling valve for all burners. The two-way valve permits individual use of either compartment for cooking purposes but prevents simultaneous use of both compartments to avoid overheating of the range, danger of explosion, etc. In closing operations, the two-way valve is often accidentally or negligently shifted beyond its neutral or closed position and thus while extinguishing the flame and also cutting off the gas supply to one compartment, furnishes gas to the other compartment of the range, which of course is highly dangerous. The general object of my present invention is to avoid such and other hazards and for such purpose I provide according to the invention, a two-way gas valve with automatically actuated stop and locking means to stop and hold the valve in closed or neutral position after the valve has been shifted to such position. A further object of the invention is to release the locking action of the stop and locking mechanism without interfering with the opening or closing action of the valve, and for such purpose the release of the stop and locking mechanism takes place in a plane angularly related to the plane in which the valve is operated. These and other features of my invention will more readily be understood from the following description of an exemplified form of my invention and the drawings forming part thereof.

Figure 1:
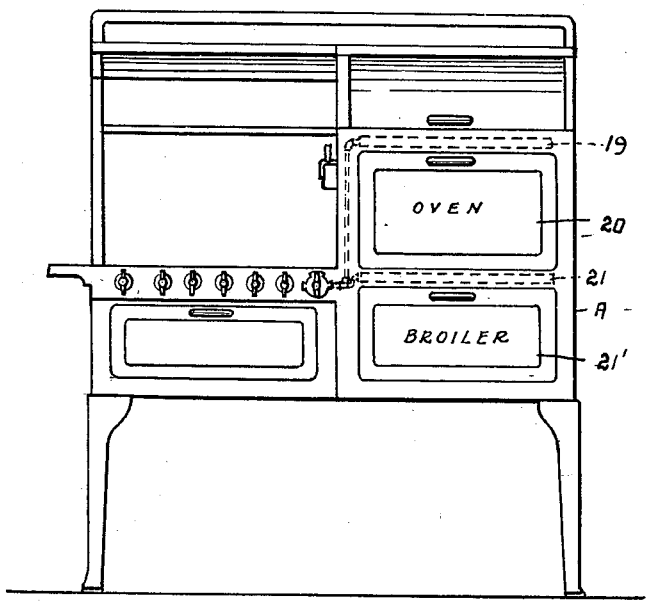
Figure 2:
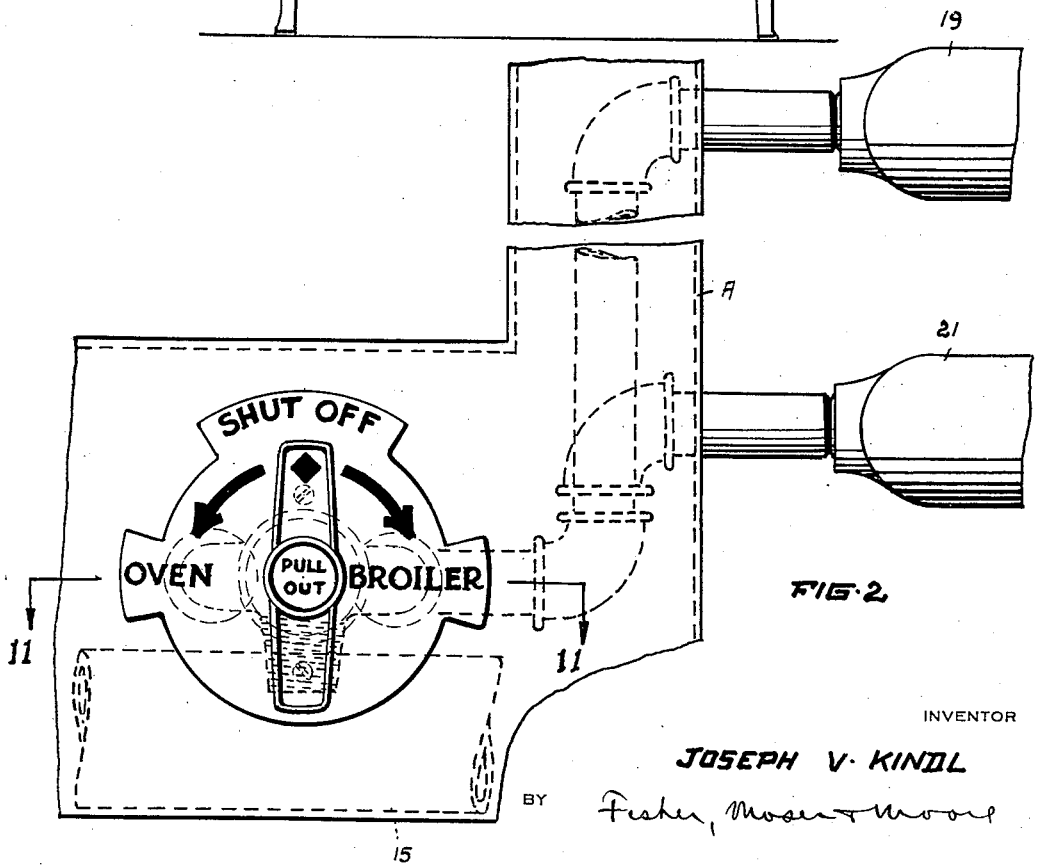

In these drawings, Fig. 1 shows a gas range with stove and broiler compartment and a two-way valve according to the invention for controlling the individual burners of said compartments. Fig. 2 is a fragmentary enlarged view of Fig. 1 showing the valve as mounted in the range. Figs. 3 through 10 show the parts of the valve. Thus, Fig. 3 is a side elevation of the handle; Fig. 4 a side elevation of the nut connecting handle and shaft with the valve body; and Figs. 5 and 6 side elevations of the two sleeved springs seating the valve and lock washer. Fig. 7 is a sectional view of the lock washer and Fig. 8 a side elevation of the operating stem; Fig. 9 is a side elevation of the rotatable valve and Fig. 10 a side elevation of the valve body. Fig. 11 is a sectional view on line 11—11 of Fig. 2. Fig. 12 is a section on line 12—12 of Fig. 11. Figs. 13 and 14 are fragmentary sectional views through the valve body and valve similar to Fig. 11, showing the valve set for communication of the gas line with the stove compartment and broiler compartment respectively, and Figs. 15 and 16 are sectional views on line 15—15 of Fig. 13 and lines 16—16 of Fig. 14, respectively. Figs. 17 through 29 show the lock mechanism for the valve stem incorporated in a one-way valve. Thus, Fig. 17 is a side elevation of the handle, Fig. 18 a side elevation of the nut connecting handle and shaft with the valve body, Figs. 19 and 20 are side elevations of the two-sleeved springs seating the valve and the lock washer. Figs. 21 and 22 are plan and side elevations respectively of the locking washer. Fig. 23 is a side elevation of the operating stem, Fig. 24 a side elevation of the rotatable valve and Fig. 25 a longitudinal sectional view of the one-way valve body. Fig. 26 is a longitudinal view of the valve assembly showing the locking washer in locking position to prevent rotation of the valve and Fig. 27 a longitudinal sectional view similar to Fig. 26 with the locking washer in raised position and engaging a stop, limiting the movement of the valve in one direction. Fig. 28 and Fig. 29 are cross sectional views through the valve assembly on line 28—28 of Fig. 26 and lines 29—29 of Fig. 27, respectively.

As exemplified in the drawings, the U-shaped cast metal body 2 of the two-way valve disclosed in Figs. 1–16 has its central portion perforated to provide a cone-shaped seat 3 for the plug valve 4 rotatably mounted therein. The branches 5 and 6 of body 2 communicate with seat 3 through drilled passages 7, 8, 9, and 10, respectively, and the outer ends of such branches are screw-threaded for standard connections with gas pipes 10 and 11, such as nipples 12, nuts 13 being employed for rigidly holding nipples 12 in place. Body 2 includes a lateral branch or nipple 14 arranged in a plane angularly related to the plane of branches 5—6, which nipple is threaded at its outer end for attachment to the manifold 15 of range A. Nipple 14 is hollow and communicates through passage 16 with seat 3 and is located in the plane of passages 7, 8, for communication therewith. A series of intersecting passages 17 and 18, in plug valve 4 may alternately be brought into alignment with passages 8, 9, and 16, to feed gas to burner 19 in the oven compartment 20 of range A or to burner 21 in the broiler compartment 21'. The valve so far resembles in operation and action well known two-way valves which have a neutral position in which both burners are simultaneously shut off.

Plug valve 4 is actuated by a slotted valve stem 22 interengaging at its slotted lower end 23 with a narrow upwardly extending portion 24 on valve 4 and at its upper end is provided with a handle 25 rigidly attached thereto by screw 26. A spring 28 forces stem 22 into engagement with extension 24, and a hollow cap member 29 threaded upon an extension 30 of body 2, holds the spring in place. Valve stem 22 carries a lock washer 31 provided with a key-shaped opening of proper size to slidably receive extension 24 of valve 4, and this washer is also provided with a finger portion 37 adapted to limit rotation of valve 4 after each half turn in either direction by engaging shoulders 33 of recessed portions 36 of extension 30 and to interlock with slot 34 of extension 30 when moved to neutral position. To provide a seat for washer 31 the lower slotted end of the stem 22 is formed with a round disk 22'.

When valve plug 4 is seated to close supply passage 16 from communication with passages 7 and 8, washer 31 yieldingly engages slot 34 in body 2. To release the finger portion 37 of this washer, stem 22 is shifted axially until said finger is entirely drawn out of said slot 34, and after a slight turn of stem 22, finger 37 will seat on and ride over the recessed outer edge 40 of extension 30. In this position the valve stem and valve can be freely rotated to make the desired connection between the main feed line and the burners. Turning of stem 22 and valve 4 to neutral position brings finger 37 of washer 31 into alignment with slot 34, and spring 28 forces such finger into said slot thereby preventing further rotation of the valve. It is therefore impossible to rotate the valve beyond its neutral position unless the valve stem is axially shifted. A short spring 39 telescoping with spring 28 seats upon the top edge 24' of portion 24 of valve 4 and yieldingly forces valve 4 into its seat 3 to prevent accidental displacement of said valve when stem 22 is axially shifted, incident to operation of the valve.

The automatic locking mechanism illustrated in Figs. 1 to 16 hereinbefore described is shown as embodied in a two-way valve but may of course be utilized with different types of valves, for example, the one-way gas range burner valve illustrated in Figs. 17 through 29. The structure clearly discloses the use of the locking washer 31 for locking the stem in its closed position and for limiting the movement of the stem during opening operations. To accomplish these results the top of body 41 of the valve is recessed at 47, to form a stop shoulder 42, engaging the extension 37 of locking washer 31 when this washer is turned in an anti-clockwise direction, by stem 22, to open the valve. The slot 34 which forms the interlocking recess for extension 37 of washer 31, adjoins the recessed portion of the valve body referred to above.

What I claim, is:

1. A valve, comprising a valve body having a valve seat and a hollow extension axially aligned with said seat, a recess in the circular top edge of said extension forming stop shoulders, a slot in the wall of said extension, a valve rotatably confined within said seat, a shaft slidably interlocked with said valve, and spring actuated means axially aligned with said shaft and said valve body and co-operating with said shoulders of said recess and said slot for limiting the rotation of said shaft when said valve is rotated to its open position and locking said shaft by automatic shifting of said means with respect to said shaft and said valve body when said valve is rotated to its neutral position, said locking means being disengageable by shifting said shaft axially.

2. A valve, comprising a valve body having a valve seat and a hollow extension aligned with said seat, a slot in the wall of said extension, a valve rotatably confined within said seat having a flat sided extension, a shaft having one end slotted and flanged, sleeved with its slotted end over said latter extension, a locking washer slidably and non-rotatably coupled with said shaft and valve and having a lateral finger portion for engagement with the slot of said hollow extension, a perforated cap member for said hollow extension guiding said shaft, and a spring seated against said cap member and said locking washer for automatically shifting said washer into engagement with said slot of said hollow extension when said valve is rotated to its neutral position.

3. A valve, comprising a valve body having a valve seat and a hollow extension aligned with said seat, a slot in the wall of said extension, a valve rotatably confined within said seat having a flat sided extension, a shaft having one end slotted and flanged, sleeved with its slotted end over said latter extension, a locking washer within said hollow extension of said body slidably and non-rotatably coupled with said shaft and valve having a lateral finger portion adapted to engage with the slot of said hollow extension, a perforated cap member for said hollow extension, a spring seated against said cap member and said locking washer for automatically shifting said washer into engagement with said slot of said hollow extension when said valve is rotated to its neutral position and a second spring axially aligned with and telescoped in said first spring, and seated against the top edge of said flat extension of said valve to yieldingly force said valve against its seat in said body.

4. A two-way valve for selectively controlling individual compartments of a gas range comprising a valve body having an inlet and two outlet openings, a rotatable valve within said body including bores for alternately connecting said inlet with one of said outlets, a shaft for operating said valve slidably interlocked therewith and means slidably and non-rotatably coupled with said shaft and valve, for automatically locking said shaft and valve against rotation when said valve is in neutral position, said locking means being disengageable by shifting said shaft axially.

5. In a two-way valve for selectively controlling individual compartments of a gas range, a valve body having a valve seat and a hollow extension aligned with said seat, a slot in the wall of said extension, a recess in the circular edge of said extension enclosing said slot, a spring-pressed valve rotatably confined within said seat having a flat sided extension, a spring-pressed washer axially shiftably and non-rotatably coupled with said valve having a finger portion for engagement with said recess and slot of said extension, and an operating stem slidably and non-rotatably coupled with said washer and the extension of said valve.

6. In a two-way valve for selectively controlling individual compartments of a gas range, a valve body having a valve seat and a hollow screw-threaded extension, a slot in the wall of said extension, a spring-pressed valve rotatably confined within said seat having a flat-sided extension, a shaft having one end slotted and flanged and engaging said extension with its slotted end, a locking washer slidably and non-rotatably coupled with said shaft and the extension of said valve, and having a lateral finger portion for engagement with one of said slots, a perforated cap member for said hollow extension guiding said shaft, and a second spring seated against said cap member and said locking washer for automatically shifting said washer and its finger portion into engagement with one of said slots when said valve is rotated to its neutral position.

7. A valve comprising a valve body having an inlet and outlet, a valve seat in said body communicating with said inlet and outlet, a rotatable valve seated upon said seat within said body including a bore affording communication between said inlet and outlet, a shaft for rotating said valve slidably interlocked therewith, and means slidably and non-rotatably coupled with said shaft and valve for automatically locking said shaft and valve with a snap action against rotation when said valve is brought to its closed position, said locking means being disengageable by shifting said shaft axially.

In testimony whereof I affix my signature.
JOSEPH V. KINDL.